United States Patent
Ross et al.

(10) Patent No.: US 9,092,895 B2
(45) Date of Patent: Jul. 28, 2015

(54) SYSTEM AND METHOD FOR SOFT-FIELD RECONSTRUCTION

(75) Inventors: Alexander Seth Ross, Albany, NY (US); Veera Venkata Lakshmi Rajesh Langoju, Karnataka (IN)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 12/973,734

(22) Filed: Dec. 20, 2010

(65) Prior Publication Data

US 2012/0157827 A1    Jun. 21, 2012

(51) Int. Cl.
G06T 11/00    (2006.01)

(52) U.S. Cl.
CPC ......... *G06T 11/006* (2013.01); *G06T 2211/424* (2013.01); *G06T 2211/436* (2013.01)

(58) Field of Classification Search
USPC .......... 382/128, 131, 199; 600/410, 411, 425, 600/427
See application file for complete search history.

(56) References Cited

U.S. PATENT DOCUMENTS

| | | |
|---|---|---|
| 6,788,758 B2 | 9/2004 | De Villiers |
| 7,099,435 B2 | 8/2006 | Heumann et al. |
| 7,203,267 B2 | 4/2007 | De Man et al. |
| 7,760,848 B2 | 7/2010 | De Man et al. |
| 2003/0210814 A1 | 11/2003 | Nelson |
| 2006/0050958 A1 | 3/2006 | Okada et al. |
| 2007/0076928 A1 | 4/2007 | Claus et al. |
| 2009/0237402 A1 | 9/2009 | Kalke |

OTHER PUBLICATIONS

Yang et al. An image-reconstruction algorithm based on Landweber's iteration method for electrical-capacitance tomography. Meas Sci Technol. 10:p. 1065-1069. 1999.*
Lehovich et al., "Choosing Anatomical-Prior Strength for Map Spect Reconstruction to Maximize Lesion Detectability", IEEE Nuclear Science Symposium Conference Record, vol. 6, Issue 1, pp. 4222-4225, Oct. 26, 2007-Nov. 3, 2007.
Bruyant et al., "Numerical Observer Study of MAP-OSEM Regularization Methods with Anatomical Priors for Lesion Detection in 67Ga Images", IEEE Transactions on Nuclear Science, vol. 51, Issue 1, Feb. 2004.
M. Soleimani, et al., Level Set Reconstruction of Conductivity and Permittivity From Boundary Electrical Measurements Using Experimental Data, Inverse Problems in Science and Engineering, vol. 14, No. 2, Mar. 2006, 193-210.
Manuchehr Soleiman, et al., A Narrow-Band Level Set Method Applied to EIT in Brain for Cryosurgery Monitoring, IEEE Transactions on Biomedical Engineering, vol. 53, No. 11, Nov. 2006, pp. 2257-2264.

(Continued)

*Primary Examiner* — Parikha Mehta
(74) *Attorney, Agent, or Firm* — The Small Patent Law Group LLC; Christopher R. Carroll

(57) ABSTRACT

A system and method for soft-field reconstruction are provided. One method includes establishing an initial estimate of a property distribution of an object, using a first reconstruction process to reconstruct an estimate of the actual property distribution and using a second reconstruction process different than the first reconstruction process to further reconstruct the estimate of the actual property distribution. A solution from the first reconstruction process is used as an initial estimate in the second reconstruction process.

25 Claims, 7 Drawing Sheets

(56) References Cited

OTHER PUBLICATIONS

Search Report and Written Opinion from corresponding EP Application No. 11192517.8-2218 dated Mar. 26, 2012.

Dorn et al., "A shape reconstruction method for electromagnetic tomography using adjoint fields and level sets", pp. 1-54, Mar. 20, 2000.

Lionheart et al., "Chapter 1, The Reconstruction Problem", Electrical Impedance Tomography: Methods, History and Applications, Dec. 21, 2004.

Yoon et al., "Simultaneous segmentation and reconstruction: A level set method approach for limited view computed tomography", vol. 37, No. 5, pp. 2329-2340, Apr. 29, 2010.

T. Kriz et al.; "A New Algorithm for Electrical Impedance Tomography Inverse Problem", Progress in Electromagnetics Research Symposium, Beijing, China, Mar. 23-27, 2009, 5 Pages.

* cited by examiner

SIGN OF π

SYSTEM AND METHOD FOR SOFT-FIELD RECONSTRUCTION

BACKGROUND

The subject matter disclosed herein relates generally to data reconstruction systems and methods, and more particularly to systems and methods to identify boundaries and estimate properties of regions of interest, particularly in soft-field reconstructions.

Soft-field tomography, such as Electrical Impedance Spectroscopy (EIS) (also referred to as Electrical Impedance Tomography (EIT)), diffuse optical tomography, elastography, and related modalities may be used to measure the internal properties of an object, such as the electrical properties of materials comprising internal structures of an object (e.g., a region of a human body). For example, in EIT systems, an estimate is made of the distribution of electrical conductivities of the internal structures. Such EIT systems reconstruct the conductivity and/or permittivity of the materials within the area or volume based on an applied excitation (e.g., current) and measured response (e.g., voltage) acquired at the surface of the area or volume. Visual distributions of the estimates can then be formed.

In soft-field tomography, conventional reconstruction algorithms rely on sensitivity matrix based algorithms, which use gradient assumptions about how the properties of interest vary throughout the area or volume being reconstructed. In particular, the sensitivity matrix assumes that the properties to be reconstructed change smoothly throughout the area or volume being reconstructed. This assumption is often a poor approximation of the distribution of properties within the actual object of interest. Accordingly, such as assumption using a gradient to define the actual distribution of the properties is often invalid. As a result, the area or volume of features of the reconstructed image is often inaccurate and multiple objects in close proximity to one another may be obscured.

BRIEF DESCRIPTION

In accordance with an embodiment, a method for soft-field tomography reconstruction is provided. The method includes establishing an initial estimate of a property distribution of an object, using a first reconstruction process to reconstruct an estimate of the actual property distribution and using a second reconstruction process different than the first reconstruction process to further reconstruct the estimate of the actual property distribution. A solution from the first reconstruction process is used as an initial estimate in the second reconstruction process.

In accordance with another embodiment, a method for soft-field tomography reconstruction is provided. The method includes performing an initial reconstruction using a sensitivity-matrix based approach to estimate one or more region of interest locations of a property distribution and using information from the initial reconstruction as a prior for a boundary location reconstruction. The method also includes performing the boundary location reconstruction using a shape detection process with the prior to localize the one or more regions of interest.

In accordance with yet another embodiment, a soft-field tomography system is provided that includes a plurality of transducers configured for positioning proximate an outer surface of an object and one or more excitation drivers coupled to the plurality of transducers and configured to generate excitation signals for the plurality of transducers. The soft-field tomography system also includes one or more response detectors coupled to the plurality of transducers and configured to measures a response on the plurality of transducers in response to the excitation applied by the plurality of transducers based on the excitation signals. The soft-field tomography system further includes a soft-field reconstruction module configured to reconstruct a property distribution of the object based on the excitation signals and the measured responses using a plurality of different reconstruction processes, wherein a solution of at least one of the plurality of reconstruction processes is used as prior information for at least one of a subsequent one of the plurality of reconstruction processes.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION

Figure 1:
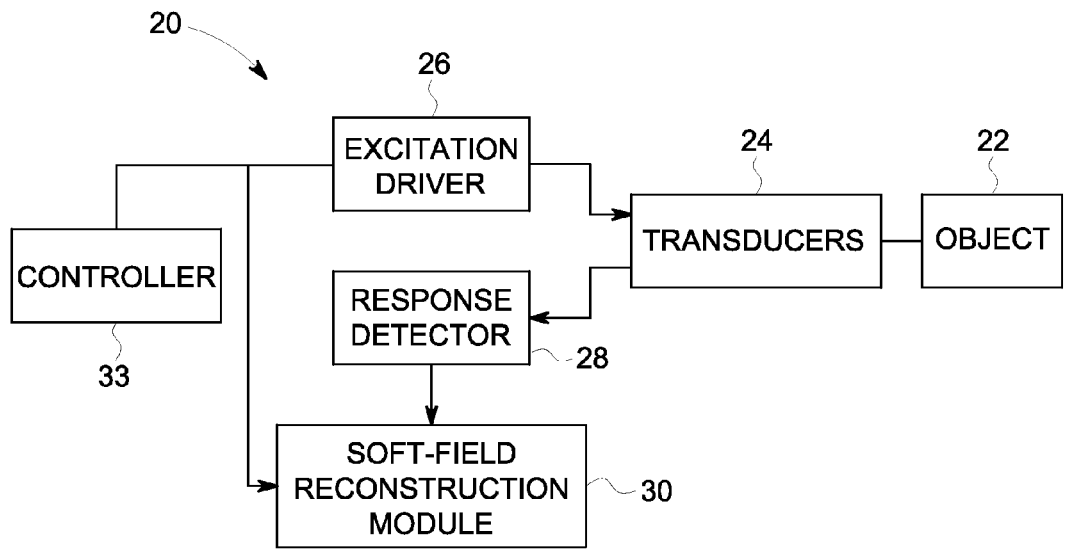
FIG. 1 is a simplified block diagram illustrating a soft-field tomography system formed in accordance with various embodiments.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, circuits or memories) may be implemented in a single piece of hardware or multiple pieces of hardware. It should be understood that the various embodiments are not limited to the arrangements, component/element interconnections and instrumentality shown in the drawings.

As used herein, a module or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" a module or a plurality of modules having a particular property may include additional such modules not having that property.

Various embodiments provide a system and method for soft-field tomography that uses prior information (priors) from estimates such as from one or more reconstruction algorithms to identify locations of regions of interest, define the boundaries for these regions, and estimate properties of the one or more defined bounded regions. The priors may be any information obtained prior to the particular reconstruction process, for example, prior information (i) from an assumption or initial estimate or (ii) provided as an output from a computing device or other algorithm (e.g., a previously performed reconstruction process). At least one technical effect is improved localization accuracy, improved estimates of property values (e.g., electrical conductivity, permittivity, optical scattering) of a region of interest, improved estimate of object or region of interest boundary, and/or improved accuracy of area and/or volume estimates. For example, in medical applications, by practicing at least one embodiment, diagnostic accuracy may be improved and false alarms for monitoring and alarm-based methods may be reduced.

It should be noted that as used herein, "soft-field tomography" refers generally to any tomographic or multidimensional extension of a tomographic method that is not "hard-field tomography".

Figure 2:
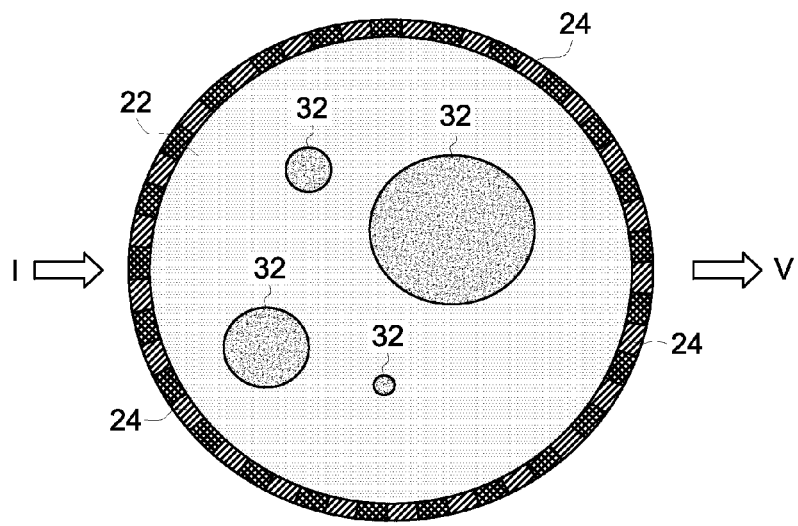
FIG. 2 is a simplified diagram illustrating reconstruction of a property distribution.

One embodiment of a soft-field tomography system 20 is illustrated in FIG. 1. For example, the soft-field tomography system 20 may be an Electrical Impedance Spectroscopy (EIS) system, also referred to as Electrical Impedance Tomography (EIT) system used to determine the electrical properties of materials within an object 22 as illustrated in FIG. 2. For example, the spatial distribution of electrical conductivity ($\sigma$) and/or permittivity ($\epsilon$) may be determined inside the object 22 or other area or volume. Thus, internal properties of the object 22 (e.g., a patient) may be determined. In the illustrated embodiment, the system 20 includes a plurality of transducers 24 (e.g., electrodes) that are positioned at or proximate a surface of the object 22, which in a healthcare application (e.g., patient monitoring or tissue characterization) may include attaching the plurality of the transducers 24 to the skin of a patient or subject. For example, the transducers 24 may be positioned on the surface of the object 22 (e.g. electrodes, thermal sources, ultrasound transducers), near the surface of the object 22 (e.g., radiofrequency antenna), or penetrating the surface of the object 22 (e.g., needle electrodes). Thus, the transducers 24 may take different forms, such as surface-contacting electrodes, standoff electrodes, capacitively coupled electrodes, and conducting coils such as antennas, among others.

It should be noted that the soft-field tomography system 20 may be other types of systems. For example, the soft-field tomography system 20 may be a Diffuse Optical Tomography (DOT) system, a Near InfraRed Spectroscopy (NIRS) system, a thermography system, an elastography system or a microwave tomography system, among others.

An excitation driver 26 and a response detector 28 are coupled to the transducers 24, which are each connected to a soft-field reconstruction module 30. The soft-field reconstruction module 30 may be any type of processor or computing device that performs soft-field reconstruction based at least in part on received responses from the transducers 24 as described in more detail herein. For example, the soft-field reconstruction module 30 may be hardware, software of a combination thereof. In one embodiment, the excitation driver 26 and the response detector 28 are physically separate devices. In other embodiments, the excitation driver 26 and the response detector 28 are physically integrated as one element. A controller 33 is also provided and sends instructions to the excitation driver 26 that drives the transducers 24 based on the instructions. It should be noted that an excitation driver 26 may be provided in connection with all or a subset of transducers 24.

It also should be noted that different types of excitations may be used to obtain property distribution data for use in the reconstruction process of the various embodiments. For example, electrical, magnetic, optical, thermal or ultrasound excitations, among others, may be used in combination with the various embodiments. In these different embodiments, the transducers 24 may be coupled to the object 22 in different ways and not necessarily in direct contact or only at a surface of the object 22 (e.g., coupled electrically, capacitively, galvanically, etc.).

In one embodiment, the object 22 is a human body region, such as a head, a chest, or a leg, wherein air and tissues have different electrical conductivities. The soft-field tomography system 20 shows conditions of the internal properties (e.g., material properties) of the human body region, and thus can assist in the diagnoses of diseases, for example, associated with hemorrhage, tumor, lung function, among others. The object is not limited to humans and animals are also subject to the techniques detailed herein. In other embodiments, the soft-field tomography system 20 can be used for generating a visual representation of the electrical impedance distribution in a variety of other applications, such as for determining the material properties in a mixed flow including oil and water, or for an underground earth area for soil analysis and roadbed inspection, among others.

In various embodiments, the transducers 24 are formed from any suitable material. For example, the types of transducer 24 used may be based on the particular application, such that a corresponding transducer type (e.g., electrode, coil, etc.) is used to generate the soft-field excitations (e.g., electromagnetic field) and receive responses of the object to the excitations for the particular application. In some embodiments, a conductive material may be used to establish electrical current. For example, the transducers 24 may be formed from one or more metals such as copper, gold, platinum, steel, silver, and alloys thereof. Other exemplary materials for forming the transducers 24 include non-metals that are electrically conductive, such as a silicon based materials used in combination with micro-circuits. In one embodiment, where the object 22 is a human body region, the transducers 24 are formed from silver-silver chloride. Additionally, the transducers 24 may be formed in different shapes and/or sizes, for example, as rod-shaped, flat plate-shaped, or needle-shaped structures. It should be noted that in some embodiments, the transducers 24 are insulated from one another. In other embodiments, the transducers 24 can be positioned in direct ohmic contact with the object 22 or be capacitively coupled to the object 22.

In operation, the transducers 24 or a subset of the transducers 24 may be used to transmit signals (e.g., deliver or modulate signals), for example, deliver electrical current continuously or to deliver a time-varying signal such that excitations may be applied across a temporal frequency range (e.g., 1 kHz to 1 MHz) to the surface of the object 22 to generate an electromagnetic (EM) field within the object 22. In an EIS or EIT application, the resulting surface potentials, namely the voltages on the transducers 24 are measured to determine an electrical conductivity or permittivity distribution using one or more embodiments of reconstruction methods as described herein. For example, a visual distribution may be reconstructed based on the geometry of the transducers 24, the applied currents and the measured voltages.

Thus, in various embodiments, the excitation driver 26 applies an excitation to each of the transducers 24 and the response detector 28 measures a response of the object 22 on each of the transducers 24 (which may be multiplexed by a multiplexer) in response to the excitation applied on the transducers 24. It should be noted that any type of excitation may be provided, for example, electrical current, electrical voltage, a magnetic field, a radio-frequency wave, a thermal field, an optical signal, a mechanical deformation and an ultrasound signal, among others.

For example, in an EIS or EIT application, and as illustrated in FIG. 2, a soft-field reconstruction is performed to identify regions of interest 32 within the object 22. As shown, the response detector 28 (shown in FIG. 1) measures a response voltage (or a response current) on the transducers 24 in response to the current (or voltage) applied by the excitation driver 26 (shown in FIG. 1) to the transducers 24.

It should be noted that the response detector 28 also may include one or more analog-signal-conditioning elements (not shown) that amplifies and/or filters the measured response voltage or current. In other embodiments, a processor of the soft-field tomography system 20 includes a signal conditioning element for amplifying and/or filtering the response voltage or response current received from the response detector 28.

Figure 3:
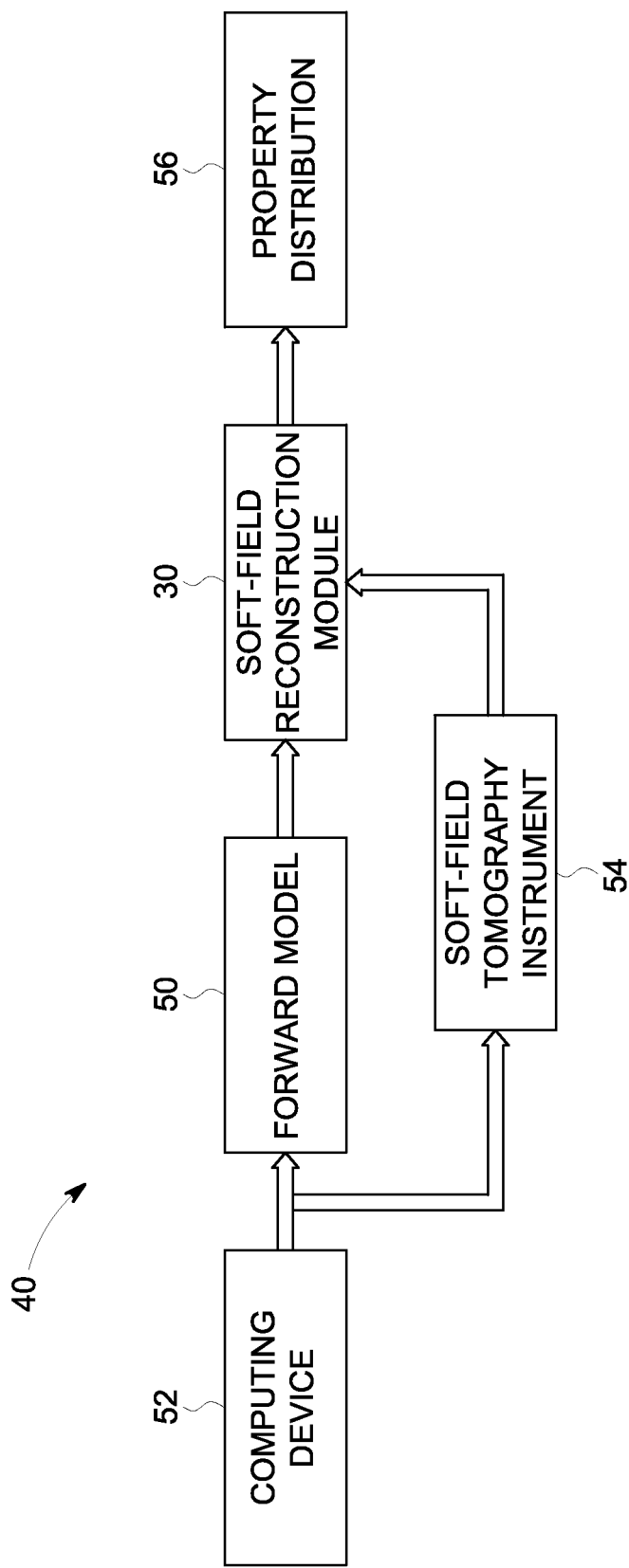
FIG. 3 is a block diagram illustrating soft-field tomography information flow in accordance with various embodiments.

The soft-field reconstruction module 30, thus, computes a response of the object 22 to the applied excitation. For example, an EIS information flow 40 is illustrated in FIG. 3. In particular, a forward model 50 is used based on excitations from a computing device 52, to predict voltages (predicted data) that are provided to the soft-field reconstruction module 30. The excitations are applied to the object 22 (shown in FIGS. 1 and 2) by the soft-field tomography instrument 54, which may include the transducers 24 and other excitation and measurement components, with measured voltages (measured data) provided also to the reconstruction module 30. The soft-field reconstruction module 30 then performs reconstruction using various embodiments to generate an estimate of the property distribution 56, for example, the impedance distribution, to identify regions of interest 32 within the object 22 (both shown in FIG. 4). It should be noted that the various components may be physically separate components or elements or may be combined. For example, the soft-field reconstruction module 30 may form part of the soft-field tomography system 20 (as illustrated in FIG. 1).

Figure 4:
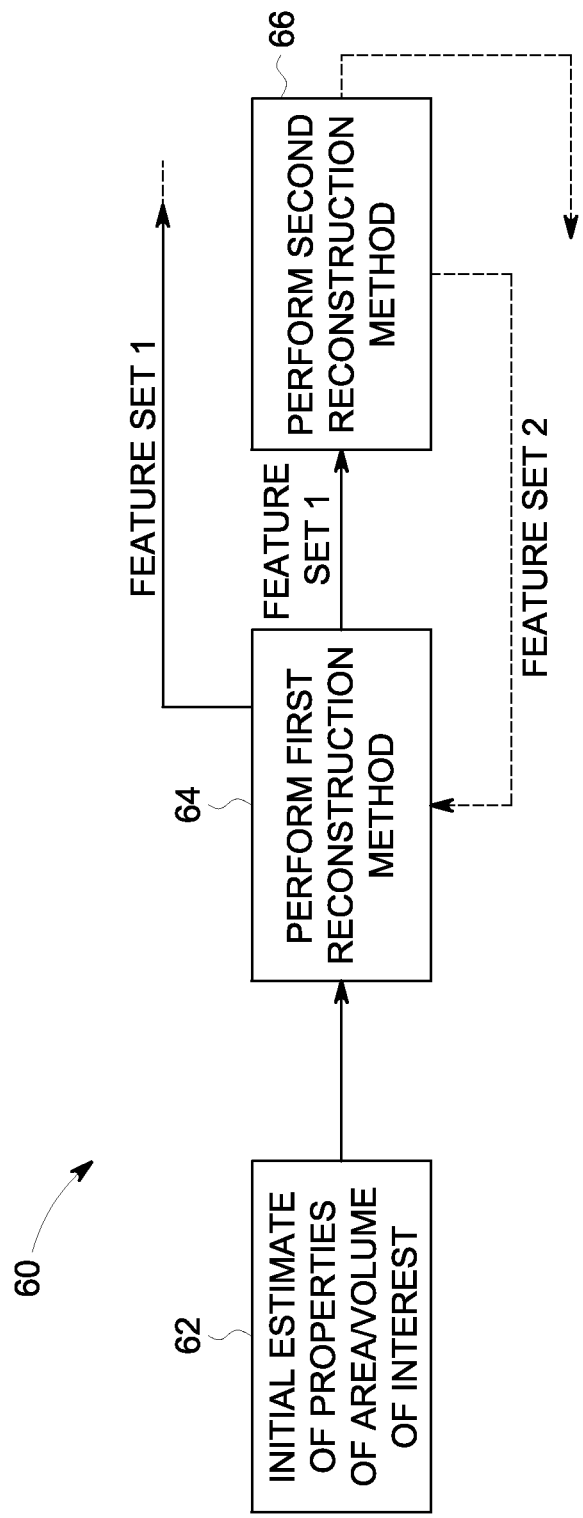
FIG. 4 is a simplified block diagram of a reconstruction process performed in accordance with various embodiments.

Using various embodiments, soft-field reconstruction is provided that uses multiple reconstructions algorithms to identify the locations of the regions of interest 32, define the boundaries of these regions of interest 32, and estimate properties of the defined bounded regions. For example, in some embodiments prior information from at least one reconstruction algorithm (initial reconstruction) is used in a subsequent different reconstruction algorithm. A simplified reconstruction process 60 in accordance with various embodiments may be used for soft-field tomography reconstruction to perform region of interest localization and/or region of interest or object boundary estimation is illustrated in FIG. 4. Thus, the region of interest localization may include targets within the object 22, targets with a region of interest or the object or boundary itself.

In particular, at 62 an initial estimate (sometimes referred to as an initial guess) is provided, such as an initial estimation of the property distribution within the area or volume of interest. For example, in an EIS or EIT reconstruction, the initial estimate may define a circular outer boundary with homogeneous conductivity distribution within the area. Using this initial estimate (which may be simply setting all values in the reconstructed volume of interest to a predetermined level), a reconstruction is performed at 64 using a first reconstruction method, which generates a first feature set, namely a feature set of the property distribution. This first reconstruction method may be a single pass method or an iterative method. The first reconstruction method in various embodiments is an initial reconstruction that provides as an output a first reconstruction solution to the distribution within the volume, such as the impedance distribution within the volume. The first reconstruction method may be an iterative method that converges to a solution. Thus, using the initial estimate, the first reconstruction method determines an estimate of the actual distribution of the properties of interest.

Thereafter, the solution from the first reconstruction method is used as the input (starting point or initial estimate) for a second reconstruction (or optionally for any subsequent reconstruction method after the second reconstruction method) that is performed at 66, which uses a second reconstruction method that generates a second feature set that is different than the first feature set. It should be noted that the solution from the first reconstruction method used by the second reconstruction method may be, for example, all or a subset of the first feature set. This second reconstruction method may be a single pass method or an iterative method. The second reconstruction method in various embodiments provides as an output a second reconstruction solution to the property distribution within the area or volume (e.g., a further reconstruction of the area or volume), such as an estimate of the actual impedance distribution within the area or volume. The second reconstruction method may be an iterative method that converges to a solution. Thus, using the initial estimate based on the output of the first reconstruction method, the second reconstruction method determines an estimate of the actual distribution of the properties of interest.

For example, the first reconstruction method in some embodiments is any class of reconstruction algorithms that provides a good or acceptable estimate of the values for the soft-field distribution in regions of interest, but not necessarily a good or acceptable estimate of the boundaries of the one or more regions of interest. Thus, the first reconstruction method may provide more clinically relevant or more accurate estimates of property distribution values and less clinically relevant or less accurate estimates of the regions of interest, thus defining a first feature set. Accordingly, the first reconstruction method may be a process that is adapted or optimized to provide an estimate of the values for the soft-field distribution in regions of interest and not the boundaries of the regions. The second reconstruction method in some embodiments provides a second feature set that is different than the first feature set. For example, in some embodiments the second reconstruction method is any class of reconstruction algorithms that provides a good or acceptable estimate of the boundary locations of the region(s) of interest of the property distribution, but not necessarily a good or acceptable estimate of the distribution of values within or outside of the one or more regions of interest. Thus, the second reconstruction method may provide more clinically relevant or more accurate estimates of the boundaries of the region(s) of interest for the soft-field distribution and less clinically relevant or less accurate estimates of the distribution values. Accordingly, the second reconstruction method may be a process that is adapted or optimized to provide an estimate of the boundaries of the soft-field distribution regions of interest and not the values for the regions.

Accordingly, in some embodiments, the first reconstruction process is selected from a class of algorithms optimized for determining values for the estimate of the actual soft-field tomography distribution and the second reconstruction process is selected from a class of algorithms optimized for shape reconstruction.

It should be noted that the output or solution of the second reconstruction algorithm performed at 66 may then be used as an input, (starting point or initial estimate) for the first reconstruction method, which is again performed at 64. For example, in the first reconstruction method the boundary shape may be assumed to be correct and the conductivity perturbed or adjusted using the second reconstruction method. Thereafter, the solution for the conductivity from the second reconstruction method is then assumed to be correct and used in the first reconstruction method wherein the boundary shape is now perturbed or adjusted to generate a solution.

Thus, in various embodiments, the first reconstruction method is used to determine a first or primary feature and the second reconstruction method is used to determine a second or secondary feature. It should be noted that the solution from the second reconstruction method may be provided as an input back to the first reconstruction method and used again to provide an additional solution. Additionally, more reconstruction methods may be used and substituted or added to the processing flow of the reconstruction process 60. The additional reconstruction methods may be performed with the feature set (or a portion thereof) from any one (or all) of the previous reconstructions used as an input. The output from any reconstruction method also can be used as an input to any subsequent reconstruction method and is not limited to the immediately subsequent reconstruction method.

Figure 5:
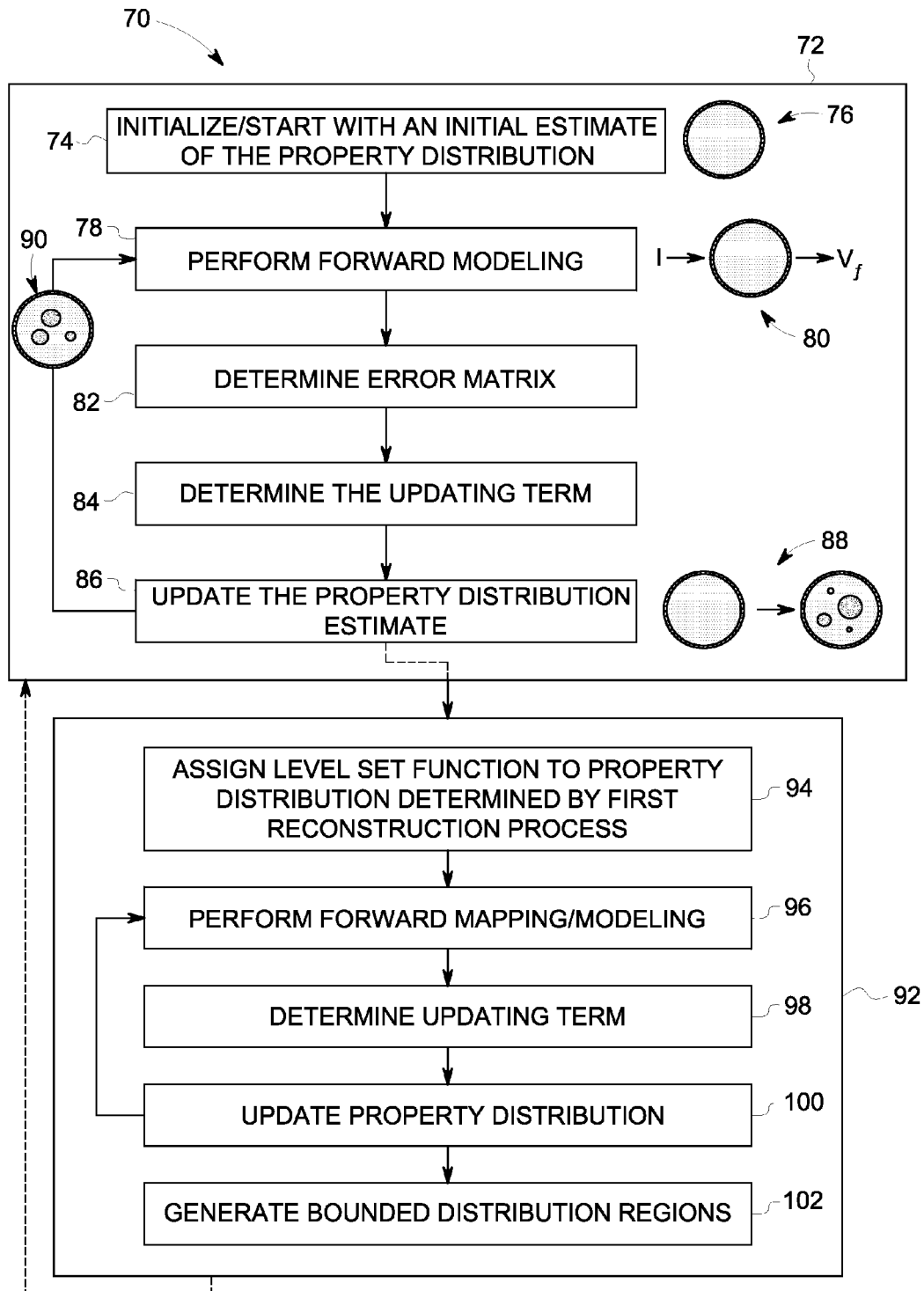
FIG. 5 is a flowchart of a reconstruction method in accordance with various embodiments.

As an example, such as for an EIS or EIT reconstruction, a method 70 as illustrated in FIG. 5 may be performed to estimate the actual distribution of the properties of interest of one or more regions of interest. The method 70 includes performing a first reconstruction process 72, with the solution from that process used as an input into a second reconstruction process 92. For example, the first reconstruction process in this embodiment may be any class or type sensitivity-matrix based reconstruction. It should be noted that although the first reconstruction process 72 is illustrated as an iterative inverse solver, namely a Gauss-Newton iterations approach, other types may be used, for example, a Newton One Step Error Reconstructor (NOSER) reconstruction process.

In particular, an initial or starting estimate is made at 74, which in various embodiments is an initial estimate of the property distribution that, in some embodiments, assumes a homogeneous field as illustrated by the distribution 76, showing a uniform distribution. Thereafter forward modeling is performed at 78, which may be any suitable forward modeling approach. As illustrated at 80, a forward modeled voltage response ($V_f$) is calculated from an applied current (I), wherein the actual response may not match the experimentally measured values (e.g., the measured voltages at the output of the soft-field tomography instrument 54 shown in FIG. 3). Thereafter, an error matrix is determined at 82, for example, using the following equation based on the difference between the measured voltage ($V_m$) and forward model voltage $V_f$:

$$E = \|V_m - V_f\|^2 \quad \text{Equation 1}$$

Thereafter, an updating term is determined at 84, for example, which may be calculated as follows:

$$\Delta\sigma_i = -[J^T J + \lambda R^T R]^{-1} [J^T(V_m - V_f) - \lambda R^T R \sigma_i] \quad \text{Equation 2}$$

In the example of equation 2, the updating term is the change in the determined conductivity ($\sigma$) and includes a regularization term $\lambda R^T R$ to smooth the solution. Thereafter the property distribution estimate is updated at 86 (and as illustrated at 88), which may be defined as follows:

$$\sigma_{i+1} = \sigma_i + \Delta\sigma_i \quad \text{Equation 3}$$

As can be seen at 88, the distribution values, in particular, the property values determined, which approximate the actual values within the volume, are identified showing how the properties of interest (e.g., conductivity or permittivity) vary throughout the volume. A visual representation, for example having color coded regions, may be provided wherein the colors correspond to estimated property values (e.g., conductivity values).

The updated field is then input back to the forward modeling step at 78, such that an updated distribution 90 is provided iteratively. The first reconstruction process 72 is performed until convergence of a solution is reached, for example, when: $V_m \approx V_f$.

Figure 6:
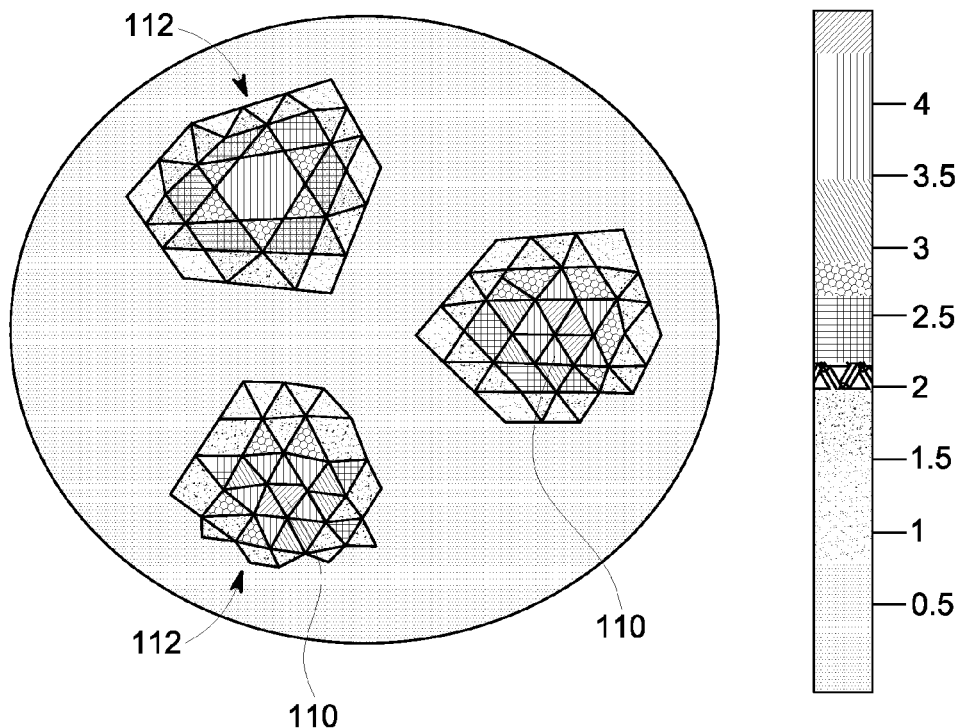
FIG. 6 is a diagram of a distribution illustrating boundaries that are not well defined.
Figure 7:
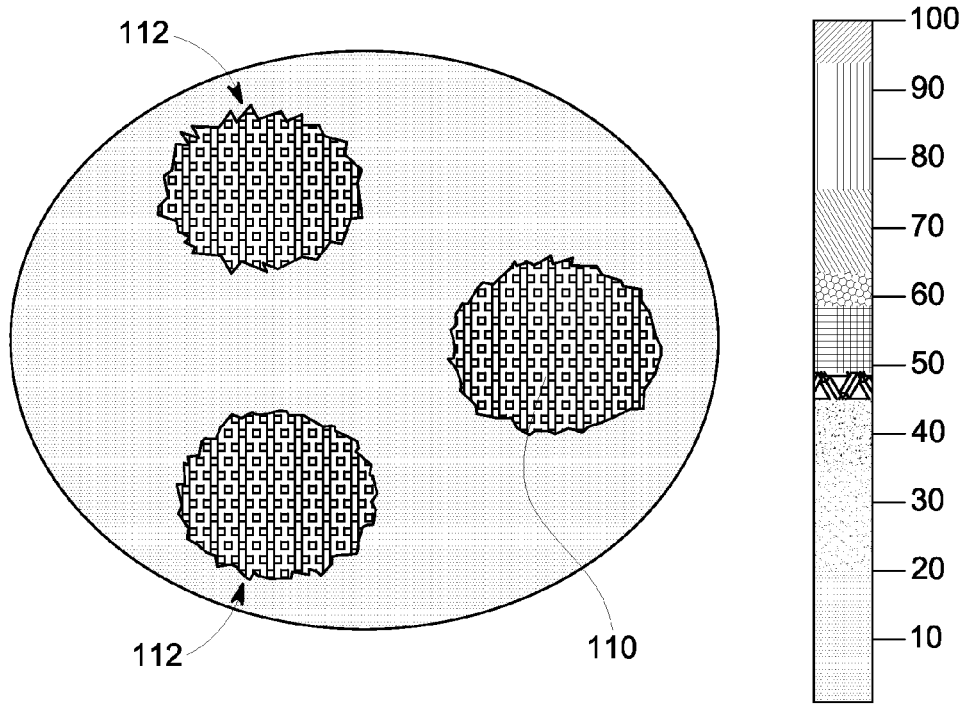
FIG. 7 is a diagram of a distribution illustrating the actual boundaries for the distribution in FIG. 6.

After convergence is reached using the first reconstruction process 72, in various embodiments, the property distribution values (e.g., conductivity values represented by the colored regions) have been determined. In particular, a clinically relevant estimate of the values of the actual distribution of the properties of interest (e.g., anomalies) results. However, as illustrated in FIG. 6, the boundaries 112 of the regions of interest, illustrated as anomalies 110 (represented by three blurred circular elements for illustration purposes) are not well defined (showing different colors) compared to the actual boundaries 112 shown in FIG. 7. Thus, although the values for the distribution within the object have converged to an acceptable level, such as to provide clinically relevant information, the boundaries are not well defined.

The method 70 then includes performing a second reconstruction process 92, with the staring point (initial estimate) for this reconstruction being or incorporating the output or solution from the first reconstruction process 72. Thus, in this example, the initial estimate for the second reconstruction process 92 is not a homogeneous distribution, but a distribution that has converged to estimates of the values for the distribution. For example, the second reconstruction process 92 in this embodiment may be any class or type of shape reconstruction method, such as a level set method used to define the boundaries of the anomalies 110 (shown in FIGS. 6 and 7). It should be noted that although the second reconstruction process 92 is illustrated as a level set shape reconstruction method, other types may be used, for example, any suitable type of reconstruction method adapted to determine the boundaries of regions or for tracking interfaces or shapes. Moreover, the first and second reconstruction processes 72 and 92 may implement or use different types of reconstruction algorithms as desired or needed, for example, based on the particular application, such as the property distribution to be estimated, the relative number and morphology of regions of interest to be estimated, and the availability of knowledge of the geometry of the object 22.

The second reconstruction process 92 in this embodiment is a shape reconstruction method wherein the geometrical boundaries of the object and of the one or more regions of interest are represented by a level set function. For example, $\sigma = \Phi\Pi_\Omega$) may define the mapping that assigns a given level set function to the parameter distribution as described in more detail below.

In particular, the background and anomaly conductivities have been estimated by the first reconstruction process 72, such that the reconstruction in various embodiments is no longer a conductivity reconstruction problem. Accordingly, at 94, the level set function is assigned a property distribution based at least in part on the determination from the first reconstruction process 72. Thus, the approximated or estimated properties (conductivities) of the one or more regions of interest and area or volume outside of the one or more regions of interest (e.g., background) are assumed to be known based at least in part on the solution from the first reconstruction process 72. In this second reconstruction process 92, apriori N information is incorporated explicitly in the modeling of the problem, wherein N may be 2.

Thereafter, a forward modeling is performed at 96. It should be noted that in the example of a level set reconstruction method, the shapes that define the boundaries can be represented by the zero level set of a level set function $\Pi$, where $\Omega$ represents the region of interest with property (conductivity) $\sigma_{anom}$ and the background property (conductivity) represented by $\sigma_{bckg}$. Using these variables, the boundary of the one or more regions of interest can be defined by the zero level set:

$$\partial\Omega=\{r:\Pi(r)=0\} \quad \text{Equation 4}$$

Figure 8:
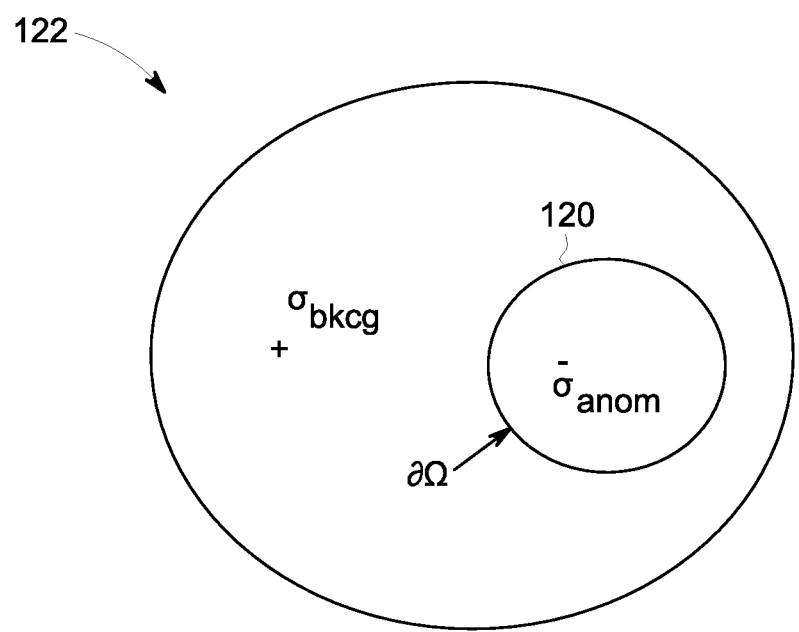
FIG. 8 is a diagram illustrating a level set process in accordance with various embodiments.

This boundary 120 is illustrated in the diagram 122 of FIG. 8. It should be noted that the boundary shape (shown as a smaller circle) is shown for simplicity and the actual boundary may be more complex and take on any closed form.

The property (conductivity) distribution may then be defined as:

$$\sigma(r) = \begin{cases} \sigma_{anom}\{r:\Pi(r)<0\} \\ \sigma_{bckg}\{r:\Pi(r)>0\} \end{cases} \quad \text{Equation 5}$$

Thus, thresholding can be performed to separate the area or volume outside the one or more regions of interest from the one or more regions of interest in this embodiment where the region of interest property and the background property ($\sigma_{bckg}$) are estimated from the first reconstruction process 72. Thus, the distribution includes only two values, one inside the one or more regions of interest and one outside the one or more regions of interest separated by one or more boundaries. A Gauss-Newton iteration can then be modeled as:

$$\sigma_n = \Phi(\Pi_{\Omega^n}) = \Phi(\Pi^n) \quad \text{Equation 6}$$

Thus, in 98 if $\Pi_n$ is the existing shape/boundary of the one or more regions of interest, and B is the Jacobian of the forward data G ($\partial G/\partial\Pi$) and K is the discretized version of $\partial\Phi/\partial\Pi$, then the updated shape/boundary, $\Pi_{n+1}$, may be defined as:

$$\Pi_{n+1} = \Pi_n + \lambda(B_n^T B_n + \alpha^2 L^T L)^{-1}[B_n^T(V_m - V_f(\Pi_n)) - \alpha^2 L^T L \Pi_n)] \quad \text{Equation 7}$$

where:
$V_f(\Pi) = F(\Phi(\Pi))$, B=JK
since $$\frac{\partial V_f}{\partial \Pi} = \frac{\partial V_f}{\partial \Phi}\frac{\partial \Phi}{\partial \Pi}$$

Thereafter, the property distribution is updated at 100, which in this embodiment is the shape and/or boundary.

This process can be iteratively performed such that steps 96, 98, 100 are iteratively performed until convergence to a solution is reached. The convergence solution may be defined using any suitable parameter, for example, defined by a predetermined tolerance or deviation level. Thereafter, numerically quantified data or a visual representation (e.g., reconstructed image) of the property distribution may be generated (e.g., displayed) at 102. It should be noted that the results of the second reconstruction process 92 (e.g., boundary determination) may be input back to the first reconstruction process 72 and used as an initial estimate at 74.

Thus, a level set function is provided in various embodiments such that the shapes are deformed in a manner that reduces a cost function (e.g., data–model misfit). By using a first and second reconstruction processes 72 and 92 in accordance with various embodiments having two-phase data, namely a two-phase distribution (e.g., outside of one or more regions of interest and inside one or more regions of interest), classified bounded regions of interest are determined that include more clinically relevant or accurate information.

Figure 9:
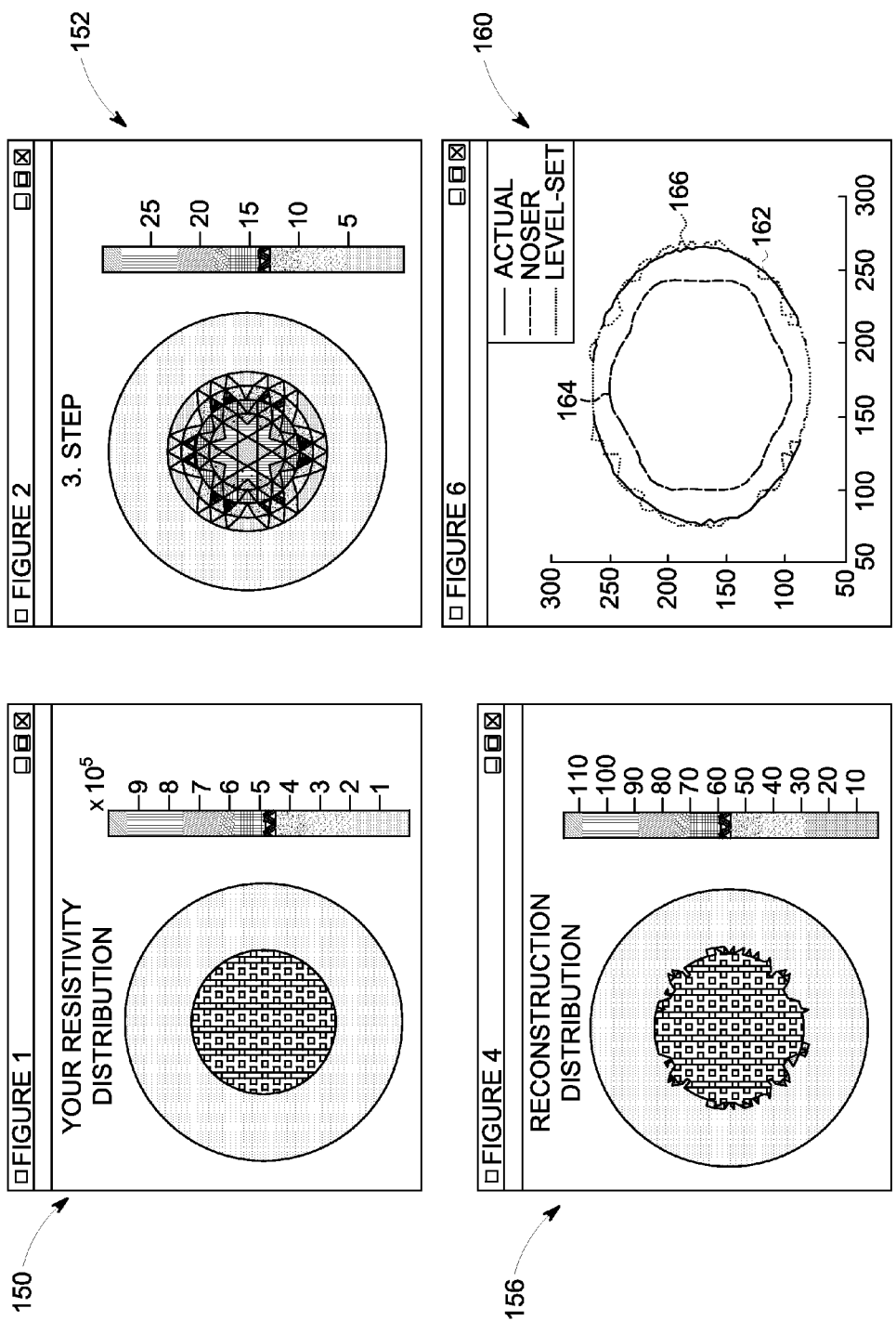
FIG. 9 is diagrams illustrating various distributions and the results of reconstruction methods in accordance with various embodiments.

Thus, as can be seen in FIG. 9, the actual distribution 150 is represented by a single centered circular region of interest with a larger circular object. The distribution 152 illustrates the results after the first reconstruction process 72, which does not include a well defined region of interest boundary (e.g., colors change at the edges of the region of interest). The initial estimate for the second reconstruction process 92 is then represented by the property distribution 152 with the final reconstruction after convergence to a solution using the second reconstruction process 92 represented by the distribution 156. Finally, the graph 160 shows the contours 162, 164 and 166 of the actual property distribution, the distribution after the first reconstruction process 72, and the property distribution after the second reconstruction process 92, respectively. As can be seen, the property distribution after the first and second reconstruction processes 72 and 92 are both performed provides the best match to the actual contour. In particular, as can be seen, the bounded property distribution better approximates the actual property distribution.

It should be noted that the various embodiments may be used to estimate distributions in regions of interest that are offset within the volume, as well as distributions of several regions of interest. Thus, the regions of interest do not have to be centered within the object as illustrated, but may be located at different positions within the object.

Thus, in accordance with some embodiments, a soft-field reconstruction is provided, for example for EIS or EIT, with improved boundary identification using shape reconstruction, wherein the bounded regions are classified. Moreover, in accordance with some embodiments, a soft-field reconstruction is provided, for example for EIS or EIT, with improved property distribution estimates using sensitivity matrix-based methods, based on improved-accuracy boundary location estimates from shape estimation algorithms. Accordingly, where the output of the first reconstruction method is used as the input to the second reconstruction method, the subsequent output of the second reconstruction method may be fed back and used as an input to the first reconstruction method, which is then performed again.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like.

The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for soft-field tomography reconstruction, the method performed by a processor, the method comprising:
    establishing, using one or more processors, an initial estimate of a property distribution for internal properties of a human body using soft-field tomography data acquired by a soft-field tomography system;
    using the one or more processors to implement a first reconstruction process, that uses a sensitivity matrix, to reconstruct an estimate of an actual property distribution including estimated property distribution values within one or more regions of interest;
    using the one or more processors to implement a second reconstruction process different than the first reconstruction process to further reconstruct the estimate of the actual property distribution to update a shape of a boundary of the one or more regions of interest in the human body, wherein a solution from the first reconstruction process is used as an initial estimate in the second reconstruction process, the solution from the first reconstruction process including the estimated property distribution values for the one or more regions of interest; and
    using the one or more processors to implement a third reconstruction process different from both the first and second reconstruction processes to perform additional reconstruction.

2. The method of claim 1, wherein the first reconstruction process determines an estimate of the values of the actual property distribution in the one or more regions of interest.

3. The method of claim 1, wherein the second reconstruction process determines an estimate of boundaries of the object or for regions of interest of the actual property distribution.

4. The method of claim 1, wherein using the second reconstruction process comprises using a shape reconstruction method that includes thresholding based on the estimated values within the one or more regions of interest and outside of the one or more regions of interest.

5. The method of claim 4, wherein the shape reconstruction method comprises a level set algorithm.

6. The method of claim 1, further comprising using a solution from the second reconstruction process as an updated input to an updated first reconstruction process, wherein the updated first reconstruction process is a second iteration of the first reconstruction process using the updated input from the second reconstruction process as the initial estimate.

7. The method of claim 1, wherein the property distribution is a distribution as determined, in one of Electrical Impedance Spectroscopy (EIS), Electrical Impedance Tomography (EIT), Diffuse Optical Tomography (DOT), Near InfraRed Spectroscopy (NIRS), thermography, elastography or microwave tomography.

8. The method of claim 1, wherein the property distribution comprises a distribution of one or more of electric conductivity, electric permittivity, magnetic permeability, optical absorbance, optical scattering, optical reflectivity, elasticity, or thermal conductivity.

9. The method of claim 1, further comprising selecting the first reconstruction process from a class of algorithms adapted to determine the values for the estimate of the actual property distribution.

10. The method of claim 9, further comprising selecting the second reconstruction process from a class of algorithms adapted to perform shape reconstruction.

11. The method of claim 1, further comprising selecting the first reconstruction process from a class of algorithms adapted to additionally perform shape reconstruction.

12. The method of claim 11, further comprising selecting the second reconstruction process from a class of algorithms adapted to additionally determine the values for the estimate of the actual property distribution.

13. The method of claim 1, further comprising using a third reconstruction process different from both the first and second reconstruction processes to perform the additional reconstruction, wherein the solution from the first reconstruction process or a solution from the second reconstruction process is used as an initial estimate in the third reconstruction process.

14. The method of claim 1, wherein the first reconstruction process determines a first feature set and the second reconstruction process determines a second feature set different than the first feature set, wherein the first and second feature sets relate to a feature of the property distribution of the object.

15. The method of claim 1, further comprising performing region of interest localization using the first reconstruction process and performing boundary estimation using the second reconstruction process.

16. A method for soft-field tomography reconstruction, the method performed by a processor, the method comprising:
performing, using one or more processors, an initial reconstruction of soft-field tomography data acquired by a soft-field tomography system using a sensitivity-matrix to estimate one or more region of interest locations in a human body of a property distribution, the one or more region of interest locations including one or more anomalies and wherein the estimate includes values for a soft-field distribution in the one or more anomalies and for a background outside of the one or more anomalies;
using the one or more processors to use information from the initial reconstruction as a prior for a boundary location reconstruction;
performing, with the one or more processors, the boundary location reconstruction using a shape reconstruction method with the prior to localize the one or more region of interest locations to estimate the boundary of the one or more anomalies in the human body;
the one or more processors using the estimate from the boundary location reconstruction as a prior for an additional reconstruction performed using the sensitivity-matrix.

17. The method of claim 16, wherein the shape reconstruction method comprises a level set algorithm that deforms a shape of the one or more anomalies to reduce a cost function.

18. The method of claim 16, wherein the initial reconstruction comprises an iterative reconstruction that includes thresholding to separate an area outside the one or more anomalies defining the background from an area inside the one or more anomalies.

19. The method of claim 16, wherein the initial reconstruction comprises a single pass reconstruction.

20. The method of claim 16, wherein performing the boundary location reconstruction comprises using two-phase data defining a two-phase distribution of estimated values inside of the one or more anomalies and outside of the one or more anomalies.

21. The method of claim 16, further comprising obtaining impedance information defining the property distribution using an electrical impedance spectroscopy system or an electrical impedance tomography system.

22. The method of claim 16, wherein the property distribution is a distribution as determined in one or more of Electrical Impedance Spectroscopy (EIS), Electrical Impedance Tomography (EIT), Diffuse Optical Tomography (DOT), Near InfraRed Spectroscopy (NIRS), thermography, elastography or microwave tomography.

23. The method of claim 16, wherein the property distribution comprises a distribution of one or more of electric conductivity, electric permittivity, magnetic permeability, optical absorbance, optical scattering, optical reflectivity, elasticity, or thermal conductivity.

24. A soft-field tomography system comprising:
a plurality of transducers positionable proximate a surface of a human body;
one or more excitation drivers coupled to the plurality of transducers and configured to generate one or more excitation signals for the plurality of transducers;
one or more response detectors coupled to the plurality of transducers and configured to measure a response of internal properties of the human body on the plurality of transducers to the excitation applied by the plurality of transducers based on the excitation signals; and
a soft-field reconstruction module configured to reconstruct a property distribution of the internal properties of the human body based on the excitation signals and the measured response using a plurality of different, reconstruction processes, wherein a solution of at least one of the plurality of reconstruction processes is used as prior information for at least one of a subsequent one of the plurality of reconstruction processes and an output of at least one of the subsequent one of the plurality of reconstruction processes is input back as an initial estimate to one of the plurality of reconstruction processes previously performed, the previously performed reconstruction process then performed again, wherein the prior information includes an estimate of values for soft-field distribution in one or more regions of interest of the human body, which is used to update a property distribution in the subsequent one of the plurality of reconstruction processes, the update including updating a shape of a boundary of the one or more regions of interest using the values from the prior information, the shape of the boundary of the one or more regions of interest that is updated provided as the initial estimate to one of the plurality of reconstruction processes, wherein the soft-field reconstruction module is configured to use a sensitivity-matrix in the reconstruction algorithm for a first reconstruction process of the plurality of reconstruction processes.

25. The soft-field tomography system of claim 24, wherein the soft-field reconstruction module is configured to use a level set algorithm for a second subsequent reconstruction process of the plurality of reconstruction processes.

* * * * *